US010002091B2

United States Patent
Yang et al.

(10) Patent No.: US 10,002,091 B2
(45) Date of Patent: Jun. 19, 2018

(54) MASTER/SLAVE MANAGEMENT FOR REDUNDANT PROCESS CONTROLLER MODULES

(71) Applicant: Honeywell International Inc., Morristown, NJ (US)

(72) Inventors: Zhi Yang, Shanghai (CN); Jie Lv, Shanghai (CN); Lei Zou, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 512 days.

(21) Appl. No.: 14/670,328

(22) Filed: Mar. 26, 2015

(65) Prior Publication Data
US 2016/0283426 A1 Sep. 29, 2016

(51) Int. Cl.
*G06F 13/00* (2006.01)
*G06F 13/364* (2006.01)
*G06F 13/42* (2006.01)
*G06F 13/40* (2006.01)

(52) U.S. Cl.
CPC ........ *G06F 13/364* (2013.01); *G06F 13/4022* (2013.01); *G06F 13/4282* (2013.01)

(58) Field of Classification Search
CPC ............................ G06F 13/362; G06F 13/4022
See application file for complete search history.

(56) References Cited

U.S. PATENT DOCUMENTS

| 4,646,304 A * | 2/1987 | Fossati ................ G06F 11/1048 714/54 |
| 5,136,498 A | 8/1992 | McLaughlin et al. |
| 6,886,107 B2 | 4/2005 | Walsh et al. |
| 7,587,481 B1 | 9/2009 | Osburn, III |
| 8,108,853 B2 | 1/2012 | Bale et al. |
| 2009/0125752 A1* | 5/2009 | Chan .................... G06F 11/2025 714/3 |
| 2011/0106996 A1* | 5/2011 | Rosso ................... G06F 13/409 710/300 |

(Continued)

OTHER PUBLICATIONS

"Dual FET Bus Switch, 2.5-V/3.3-V Low Voltage High-Bandwidth Bus Switch", Texas Instruments, Oct. 2003—Revised Oct. 2009, 14 pages.

(Continued)

*Primary Examiner* — Zachary K Huson

(57) ABSTRACT

A system comprising first and second redundant controller modules, each controller module comprising mode management circuitry configured to identify whether the corresponding controller module operates in a master mode or a slave mode. The mode management circuitry in each controller module is configured to couple to the mode management circuitry in the other controller module. The mode management circuitries in the controller modules are configured to collectively operate so that one of the controller modules is assigned the master mode and the other of the controller modules is assigned the slave mode. At least one of the mode management circuitries in the controller modules is configured to assign the master mode to the corresponding controller module based on a takeover signal when the mode management circuitry in the corresponding controller module is ready for use.

20 Claims, 7 Drawing Sheets

(56) References Cited

U.S. PATENT DOCUMENTS

2015/0046710 A1    2/2015   Clish et al.

OTHER PUBLICATIONS

"SN74CB3Q3305 Dual FET Bus Switch, 2.5-V/3.3-V Low Voltage High-Bandwidth Bus Switch", Texas Instruments, Oct. 2003—Revised Nov. 2015, 13 pages.
"Dual FET Bus Switch, 2.5-V/3.3-V Low Voltage High-Bandwidth Bus Switch", Texas Instruments, Dec. 2002—Revised Jan. 2011, 25 pages.
Notification of Transmittal of the International Search Report and the Written Opinion of the International Searching Authority dated Jul. 12, 2016 in connection with International Application No. PCT/US2016/023367, 14 pages.

\* cited by examiner

MASTER/SLAVE MANAGEMENT FOR REDUNDANT PROCESS CONTROLLER MODULES

TECHNICAL FIELD

This disclosure is generally directed to industrial process control and automation systems. More specifically, this disclosure is directed to an apparatus and method for master/slave management for redundant process controller modules.

BACKGROUND

A remote terminal unit (RTU) represents a device or system that provides localized control and data access at a site that is remote from a supervisory control and data acquisition (SCADA) system or other automation system. For example, multiple RTUs can be used at different sites and for different purposes in an oil and gas field. The RTUs can collect data, perform local control, record historical values using sensors and actuators at different sites (such as wells, pipelines, and compression stations), and provide live and historical data to an automation system. The automation system can execute control logic and alter the operations of actuators at the different sites via the RTUs. The RTUs themselves could also incorporate algorithms for data analytics.

In general, RTUs have increased in usage and complexity from their early designs in the 1970s. Today, RTUs often need to reliably support a large set of application-specific network capabilities and protocols, as well as support a number of control execution models and provide smart device integration.

SUMMARY

This disclosure provides an apparatus and method for master/slave management for redundant process controller modules.

In a first embodiment, a system includes first and second redundant controller modules, each controller module comprising mode management circuitry configured to identify whether the corresponding controller module operates in a master mode or a slave mode. The mode management circuitry in each controller module is configured to couple to the mode management circuitry in the other controller module. The mode management circuitries in the controller modules are configured to collectively operate so that one of the controller modules is assigned the master mode and the other of the controller modules is assigned the slave mode. At least one of the mode management circuitries in the controller modules is configured to assign the master mode to the corresponding controller module based on a takeover signal when the mode management circuitry in the corresponding controller module is ready for use.

In a second embodiment, an apparatus includes a first controller module comprising first mode management circuitry configured to identify whether the first controller module operates in a master mode or a slave mode. The first controller module is configured to couple to second mode management circuitry in a second controller module. The first controller module is configured to collectively operate with the second mode management circuitry so that one of the controller modules is assigned the master mode and the other of the controller modules is assigned the slave mode. The first controller module is configured to assign the master mode to the first controller module based on a takeover signal when the first mode management circuitry is ready for use.

In a third embodiment, a method includes operating a first controller module that is configured to be coupled to a second controller module. The method includes identifying, by first mode management circuitry of the first controller module, whether the first controller module operates in a master mode or a slave mode. The first mode management circuitry collectively operates with second mode management circuitry of the second controller module so that one of the controller modules is assigned the master mode and the other of the controller modules is assigned the slave mode. The first mode management circuitry assigns the master mode to the first controller module based on a takeover signal when the first mode management circuitry is ready for use.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

As noted above, remote terminal units (RTUs) have increased in complexity from their early designs, and current RTUs often need to reliably support a number of more advanced features. One way to obtain improved reliability is by providing redundant process controller modules. Moreover, master/slave management can be used to control which controller module operates in a master mode and which controller module operates in a slave mode.

Figure 1:
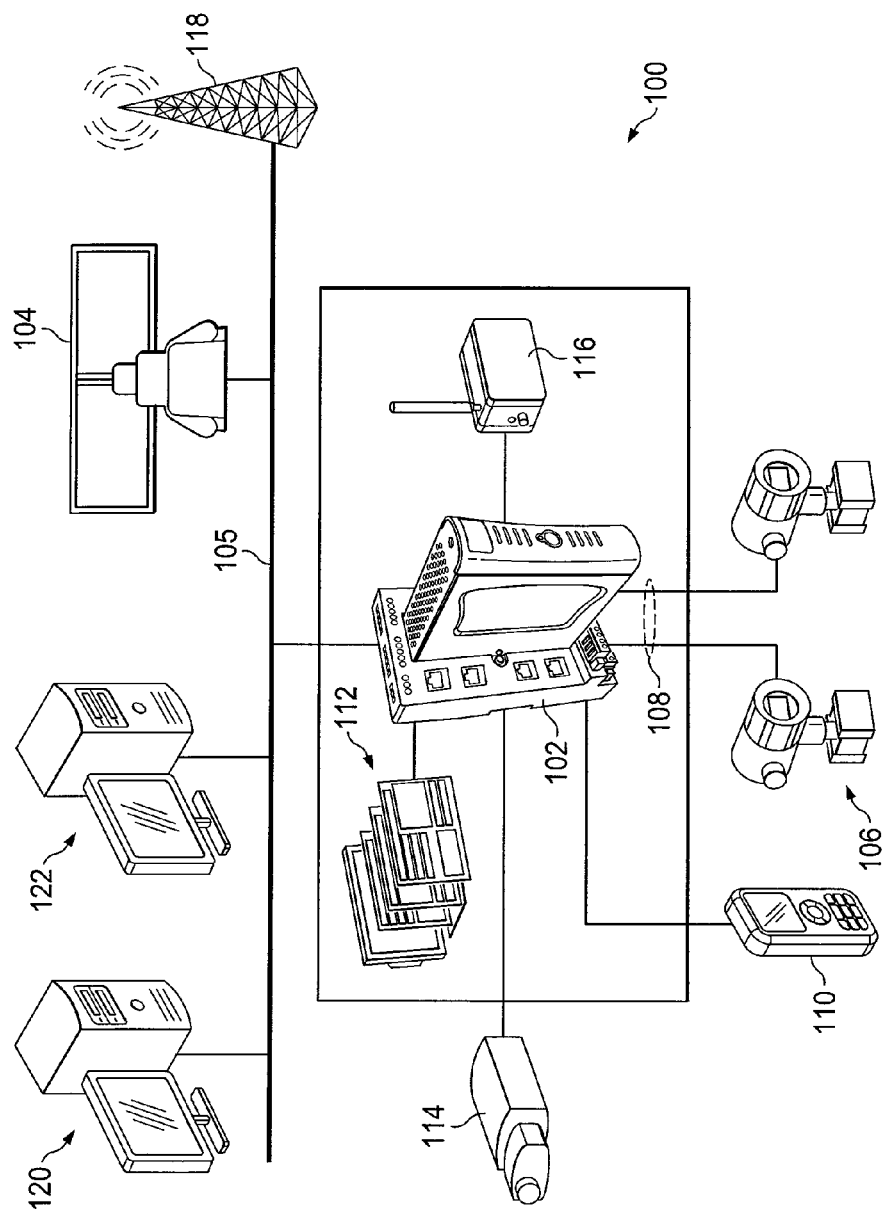
FIG. 1 illustrates an example industrial control and automation system having a remote terminal unit (RTU) according to this disclosure.

FIG. 1 illustrates an example industrial control and automation system 100 having an RTU 102 according to this disclosure. Note that the RTU 102 may also be referred to in the art as a remote telemetry unit. Also note that while a single RTU 102 is shown here, the system 100 could include any number of RTUs 102 distributed in one or more geographical areas.

The RTU 102 represents a device or system that provides localized control and data access at a site that is remote from a supervisory control and data acquisition (SCADA) system or other control system 104. For example, the RTU 102 could be positioned at or near an oil, gas, or water well or power substation. In these or other situations, the RTU 102 can be used to collect data from local sensors and process the data to generate control signals for local actuators. The RTU 102 can also interact with the control system 104 as needed. In this way, process control and automation functions can be provided at locations remote from the control system 104. The control system 104 is shown as communicating with the RTU 102 over a wired network 105 and using wireless connections, such as via microwave, cellular, or other radio frequency (RF) communications. However, the RTU 102 could communicate with the control system 104 over any suitable wired or wireless connection(s). In some embodiments, the components 102-104 could ordinarily communicate using a wired connection, with wireless communications used as backup.

The RTU 102 also communicates and interacts with one or more industrial field devices 106. The field devices 106 could include sensors that measure one or more characteristics of a process, actuators that alter one or more characteristics of a process, or other industrial field devices. In this example, the RTU 102 uses wired connections 108 to communicate with the field devices 106. The wired connections 108 could include serial connections (such as RS232 or RS485 connections), Ethernet connections, industrial protocol connections, or other wired connections. Note, however, that the RTU 102 could also communicate wirelessly with one or more field devices 106.

The RTU 102 in this example also communicates and interacts with at least one local user device 110. The user device 110 could be used by personnel to interact with the RTU 102 or with the field devices 106 or the control system 104 communicating with the RTU 102. The user device 110 includes any suitable structure supporting user interaction with an RTU.

Various other components could optionally be used with the RTU 102. For example, the RTU 102 could interact with one or more human-machine interfaces (HMIs) 112, such as display screens or operator consoles. The HMIs 112 can be used to receive data from or provide data to the RTU 102. One or more security cameras 114 (such as Internet Protocol cameras) could be used to capture still or video images and to provide the images to a remote location (such as a security center) via the RTU 102. A wireless radio 116 could be used to support wireless communications between the RTU 102 and a remote access point 118, which communicates with the control system 104 or other remote systems via the network 105. The other remote systems can include a field device manager (FDM) 120 or other asset manager and/or an RTU builder 122. The FDM 120 can be used to configure and manage assets such as field devices (including the field devices 106), and the RTU builder 122 can be used to configure and manage RTUs (including the RTU 102).

The RTU 102 has the ability to support a flexible mix of input/output (I/O) channel types. For example, the channel types can include analog inputs (AIs), analog outputs (AOs), digital inputs (DIs), digital outputs (DOs), and pulse accumulator inputs (PIs). The AIs and AOs may or may not support digital communications, such as digital communications over 4-20 mA connections compliant with the HIGHWAY ADDRESSABLE REMOTE TRANSDUCER (HART) protocol. Some RTUs 102 can achieve a desired mix of I/O channel types using I/O cards that have a fixed number of inputs and outputs, where each input or output is fixed to a particular type. Other RTUs 102 can achieve a desired mix of I/O channel types using I/O cards with reconfigurable inputs or outputs. Moreover, some RTUs 102 can be expandable so that one or more I/O modules (each with one or more I/O channels) can be used with the RTUs 102.

In particular embodiments, the RTU 102 can have one, some, or all of the following features. First, the RTU 102 can support low-power operation, such as from about 1.8 W to about 4 W, and "solar powered with battery backup" operations. Second, the RTU 102 can support operation in extended temperature ranges, such as from about −40° C. to about +75° C. Third, the RTU 102 can support expansion so that a configurable number of I/O channels can be used with the RTU 102. Fourth, the RTU 102 can support a variety of control execution methods, such as function block, ladder logic, user-structured text and programming, and sequence operations. Fourth, the RTU 102 can support two-, three-, or four-wire analog inputs and outputs for both field- and device-powered transmitters and smart valve positioners. Fifth, the RTU 102 can support other I/O types without restriction in terms of mix, including AI, AI with digital communication, AO, AO with digital communication, DI (including digital input sequence of event or "DI-SOE" inputs), DO, and PI. Sixth, the RTU 102 can support RTU control module redundancy. Seventh, the RTU 102 can support RTU pricing, which is lower than conventional distributed control system (DCS) devices.

Although FIG. 1 illustrates one example of an industrial control and automation system 100 having an RTU 102, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while shown as being used with wired field devices, the RTU 102 could be used with only wireless field devices or with both wired and wireless field devices. In addition, FIG. 1 illustrates one example operational environment where an RTU 102 can be used. One or more RTUs could be used in any other suitable system.

Figure 2:
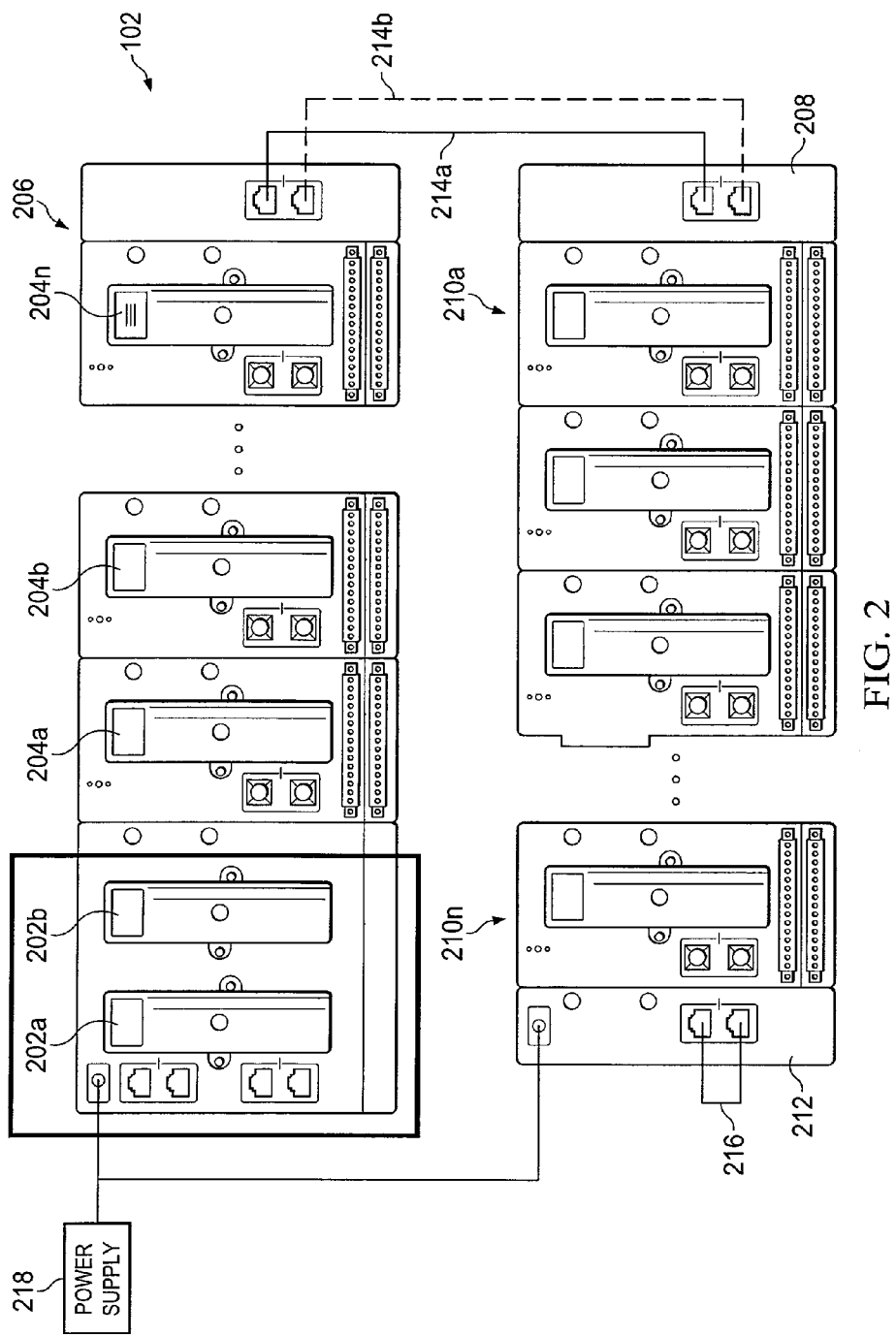
FIGS. 2 through 4 illustrate details of an example RTU according to this disclosure.
Figure 3A:
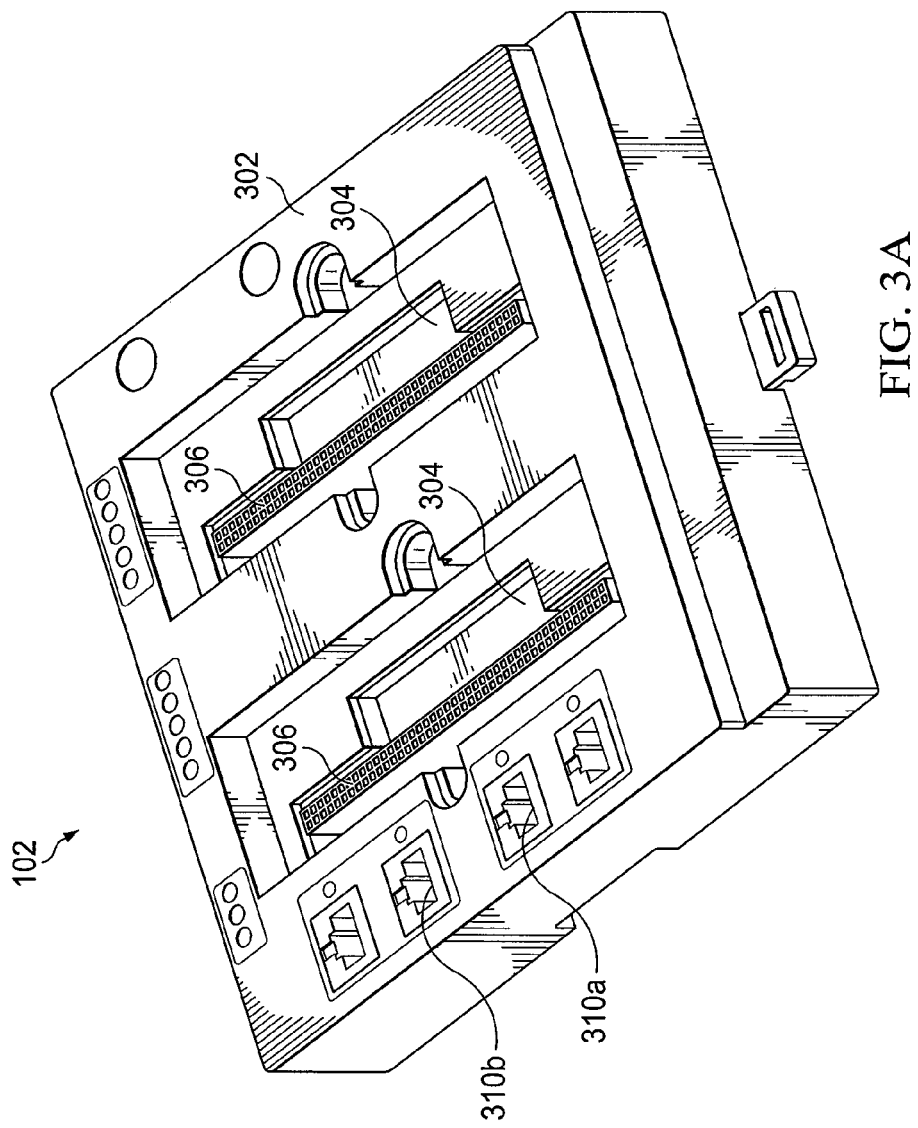
Figure 3B:
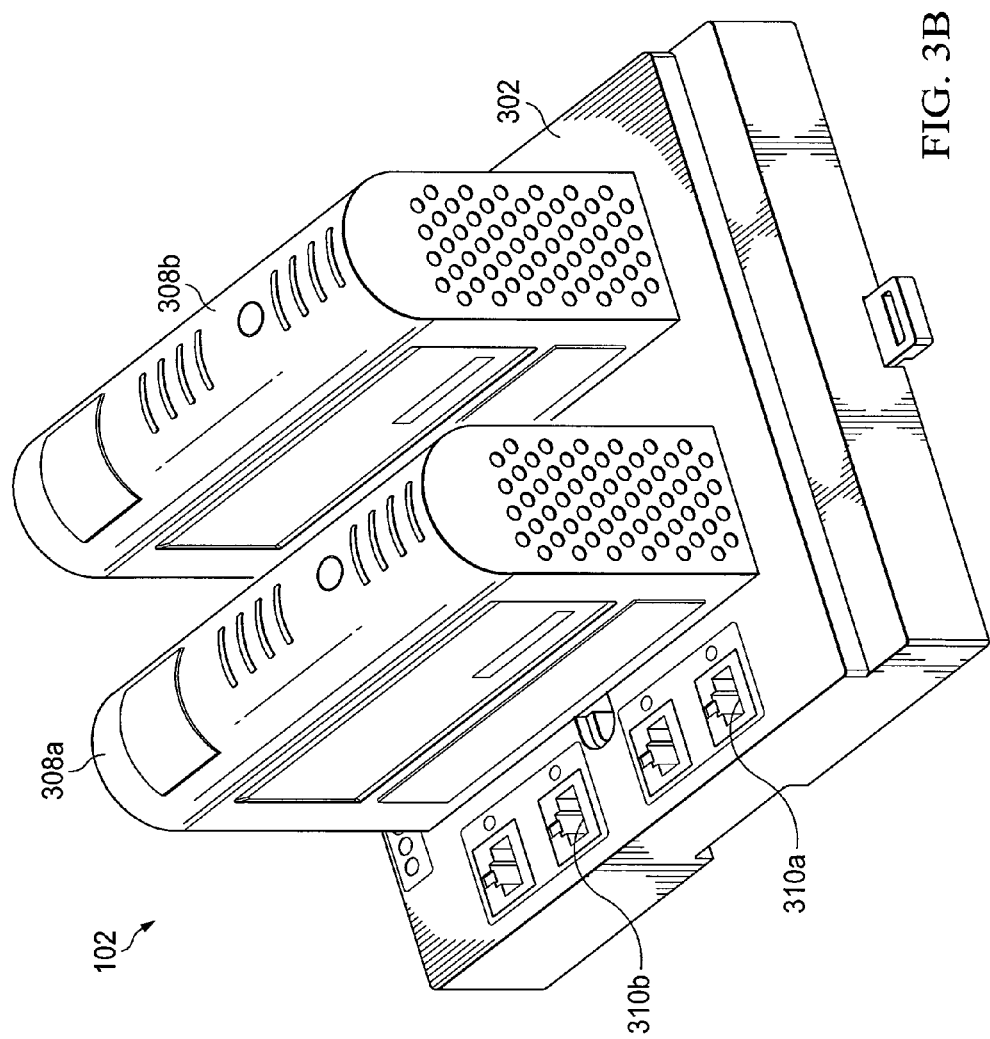
Figure 4:
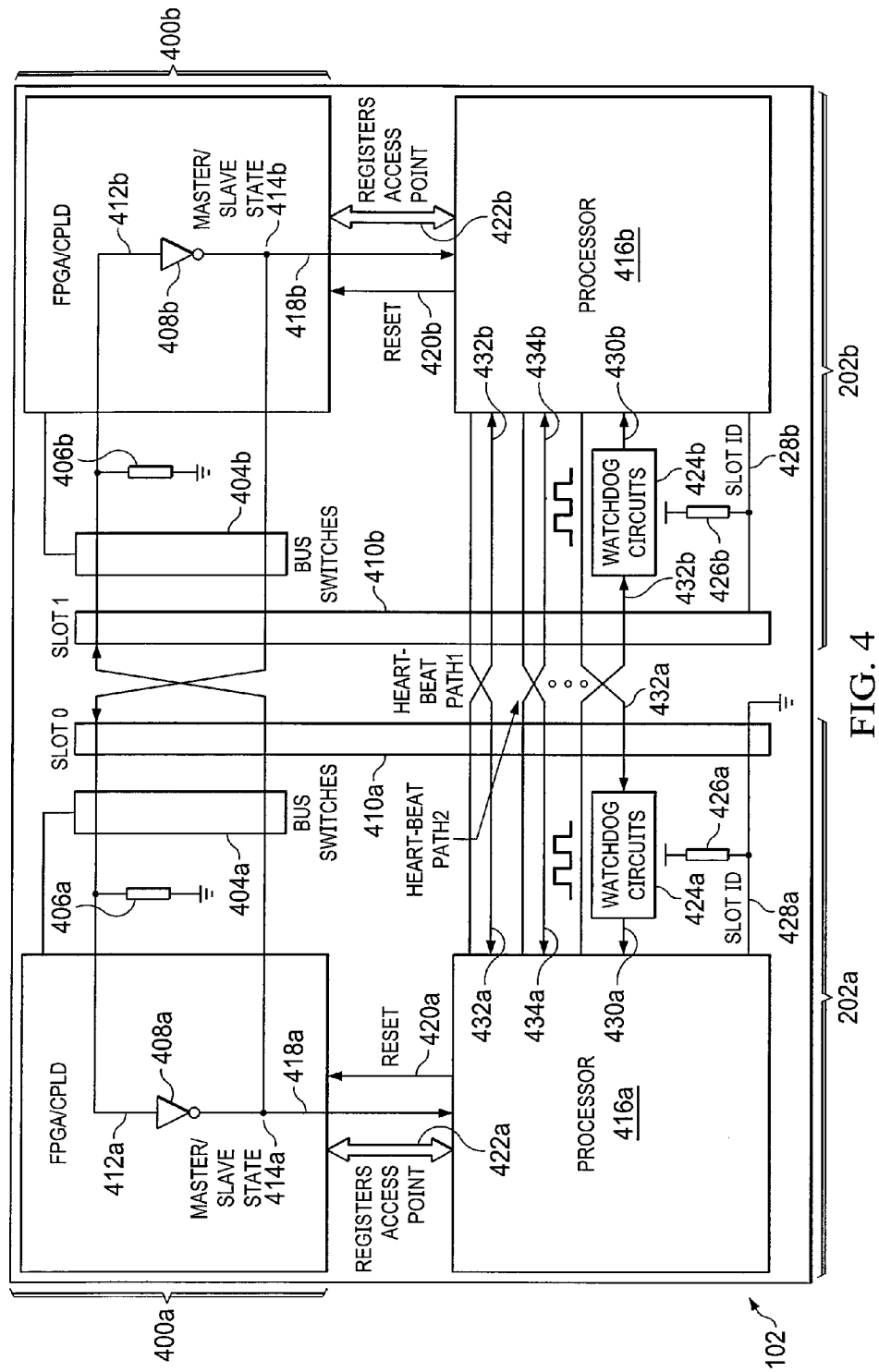

FIGS. 2 through 4 illustrate details of an example RTU 102 according to this disclosure. For ease of explanation, the RTU 102 is described as being used in the system 100 of FIG. 1. However, the RTU 102 could be used in any other suitable system.

FIG. 2 illustrates an example of the RTU 102 with redundant controller modules 202a-202b, a first set of I/O modules 204a-204n, and an expansion board 206. Each controller module 202a-202b represents a module that executes control logic and other functions of the RTU 102. For example, each controller module 202a-202b could execute control logic that analyzes sensor data and generates control signals for actuators. Each controller module 202a-202b could also execute functions that control the overall operation of the RTU 102, such as functions supporting communications with external devices or systems. Each controller module 202a-202b includes any suitable structure for controlling one or more operations of an RTU. In some embodiments, each controller module 202a-202b includes at least one processing device that executes a LINUX or other operating system.

The I/O modules 204a-204n support communications between the controller modules 202a-202b and external devices or systems (such as the field devices 106) via I/O channels of the I/O modules 204a-204n. Each I/O module 204a-204n includes circuitry supporting the use of one or more I/O channels. If an I/O module supports the use of one or more reconfigurable I/O channels, the I/O module 204a-204n also includes circuitry that configures at least one I/O channel as needed. The circuitry can be used to configure and reconfigure each I/O channel as desired. For instance, example types of reconfigurable I/O channels are shown in U.S. Pat. No. 8,072,098; U.S. Pat. No. 8,392,626; and U.S. Pat. No. 8,656,065 (all of which are hereby incorporated by reference in their entirety). Also, the use of reconfigurable I/O channels in an RTU is described in U.S. patent application Ser. No. 14/228,142 (which is hereby incorporated by reference in its entirety). The RTU 102 can include any number of I/O modules 204a-204n. In some embodiments, a specified number of I/O modules 204a-204n (such as eight modules) can be built into the RTU 102.

The expansion board 206 allows the RTU 102 to be coupled to an expansion board 208, which is coupled to a second set of I/O modules 210a-210n. The I/O modules 210a-210n could have the same or similar structure as the I/O modules 204a-204n, and any number of I/O modules 210a-210n could be used in the second set (such as eight modules). An expansion board 212 can be used to couple to a third set of I/O modules. Additional I/O modules can be added in a similar manner.

Each expansion board 206, 208, 212 includes any suitable structure facilitating the addition of one or more I/O modules to an RTU. In this example, two electrical paths 214a-214b are formed through the RTU 102, and the electrical paths 214a-214b meet at a loop 216. The electrical paths 214a-214b could be formed in any suitable manner, such as by using Ethernet connections and electrical paths through the I/O modules and expansion boards. The loop 216 can be used to indicate that no additional I/O modules are presently connected to the RTU 102. Note, however, that the loop 216 could also be placed on the expansion board 206 to indicate that no additional sets of I/O modules are currently connected to the RTU 102.

A power supply (PS) 218 provides operating power to the components of the RTU 102. The power supply 218 includes any suitable structure(s) configured to provide operating power to an RTU. For example, the power supply 218 could include one or more batteries, solar panels, fuel cells, or other source(s) of power.

In some embodiments, the controller modules 202a-202b are implemented using separate circuit boards. Communications between the redundant controller modules 202a-202b could occur via various communication interfaces of the circuit boards. If the redundant controller modules 202a-202b are present in the RTU 102 (which need not always be the case), the RTU 102 can automatically manage which redundant controller module has control of each I/O module and provide seamless switchover upon a failure of a controller module.

FIGS. 3A and 3B illustrate additional details regarding the example RTU 102. FIG. 3A shows that a backplane 302 of the RTU 102 includes two controller mounting slots 304, where each mounting slot 304 includes a connector 306 configured to be connected to a board-to-board connector of a controller module 202a-202b. In FIG. 3B, the redundant controller modules 202a-202b are plugged into the backplane 302 of the RTU 102 via their board-to-board connectors, and housing members 308a-308b are used to cover and protect the controller modules 202a-202b. The housing members 308a-308b can have any suitable size, shape, and dimensions and be formed from any suitable material(s) (such as metal or ruggedized plastic). Similar material(s) could be used to cover the backplane 302.

The RTU 102 also includes various ports 310a-310b that facilitate communications with other devices and systems. For example, the ports 310a could denote uplink/downlink ports, and the ports 310b could denote RS232 ports. Other or additional ports (such as two RS485 ports) could be used with the RTU 102. The ports 310a can be used to couple the RTU 102 to higher-level or lower-level devices, such as the control system 104, FDM 120, or RTU builder 122 via the network 105. The ports 310a could represent any suitable structures for coupling to one or more communication links, such as Ethernet ports. The ports 310b and the RS485 ports could be used to couple the RTU 102 to one or more field devices or other devices that use the RS232 or RS485 serial protocol.

FIG. 4 illustrates additional details of an example RTU 102, including details of the controller modules 202a-202b. In many industrial control settings, two redundant controllers are used, one operating in the primary mode and another operating in a secondary or backup mode. In the RTU 102, the controller modules 202a-202b operate as a redundant pair that monitor one another. In this example, the controller modules 202a-202b respectively include board-to-board connectors 410a-410b, which are configured to couple to the connectors 306 on the backplane 302. The controller modules 202a-202b can therefore communicate with one another via the connectors 306 and the backplane 302.

Master/slave management devices 400a-400b of the controller modules 202a-202b are configured to automatically manage which of the controller modules 202a-202b is operating as the primary controller module for the I/O modules. The master/slave management devices 400a-400b also provide for seamless switchover upon a failure of one of the controller modules 202a-202b. When there is a problem with one of the controller modules 202a-202b, the other controller module will take over the primary role. During operation, one of the controller modules 202a-202b will be in a "master" state while the other controller module is in a "slave" state.

In the illustrated example, the master/slave management devices 400a-400b are implemented using logic devices 402a-402b, such as field-programmable gate array (FPGA) logic circuits or complex programmable logic device (CPLD) logic circuits. In these embodiments, the master/slave management devices 400a-400b can be implemented without flip-flips, so no clock signal is required for their operation.

The logic circuits 402a-402b are coupled to one another via the connectors 306, the board-to-board connectors 410a-410b, and two sets of bus switches 404a-404b. Pull-down resistors 406a-406b are coupled to inputs of NOT gates 408a-408b implemented within the logic circuits 402a-402b. The logic circuits 402a-402b include the same components, so the description of the components and features of the logic circuit 402a below also applies to the logic circuit 402b.

The logic circuit 402a includes the NOT gate 408a, which has an input terminal 412a coupled to a first switch in the set of bus switches 404a and an output terminal 414a coupled to a second switch in the set of bus switches 404a. An output signal of the NOT gate 408a denotes the current master/slave state of the controller module 202a. For example, a logic 1 (high) value could indicate that the controller module 202a has the master state and implements the primary control role, and a logic 0 (low) value could indicate that the controller module 202a has the slave state. The output terminal 414a of the NOT gate 408a is connected to the input terminal 412b of the NOT gate 408b of the other logic circuit 402b via the bus switches 404a-404b, connectors 410a-410b, and backplane 302. The two NOT gates 408a-408b therefore effectively form a circular circuit, where the output of each NOT gate 408a-408b is coupled to the input of the other NOT gate 408a-408b. This helps to ensure that only one controller module can take the role of master.

The output terminal 414a of the NOT gate 408a is also connected to at least one processing device 416a in the controller module 202a. This enables the logic circuit 402a to inform the corresponding processing device 416a of its master/slave state using a state signal 418a. The processing device 416a retrieves or checks the level of the state signal 418a and determines the current state of the controller module 202a based on the state signal 418a. In some embodiments, the state signal 418a can implement a bi-edge interrupt to the processing device 416a so as to indicate a state change from master to slave or from slave to master. The logic circuit 402a also receives a reset signal 420a from the processing device 416a, which allows the logic circuit 402a to determine the operational state of the processing device 416a and to use that information to control whether the controller module 202a is operational. The logic circuit 402a further includes a register that is accessible by the processing device 416a through a register access port connection 422a.

Each controller module 202a-202b includes its own processing device(s) 416a-416b, watchdog circuits 424a-424b, and resistor 426a-426b. The description of the components and features of the controller module 202a below also applies to the controller module 202b unless stated otherwise. The processing device 416a controls the functions of the controller module 202a. The processing device 416a includes multiple inputs for receiving information, including a slot identifier input 428a, watchdog circuit input 430a, and first and second heartbeat path inputs 432a and 434a. Also, the processing device 416a receives the state signal 418a from the logic circuit 402a. The processing device 416a further includes multiple outputs, such as an output to the register access port connection 422a. In some embodiments, the processing device 416a is coupled to a communication interface, such as an Ethernet or UART interface, to exchange heartbeat signals or other signals with the processing device 416b.

In response to establishing a connection to the backplane 302, the processing device 416a generates and sends the reset signal 420a to the logic circuit 402a. The reset signal 420a could represent an active-low signal from the processing device 416a. The reset signal 420a sets the internal logic circuit 402a back to a default condition. The processing device 416 holds the reset signal 420a at a specified level during logic circuit configuration (such as FPGA configuration) and can maintain the level for a short time after the logic circuit configuration. When ready, the processing device 416a changes the reset signal 420a, such as to a high level. Accordingly, the reset signal 420 controls when the logic circuit 402a is ready for use.

The active time of the reset signals 420a-420b can be different according to the slot identifiers assigned to the controller modules 202-202b. For example, the reset active time of slot 1 can be longer than the reset active time of slot 0. The amount of time from establishing a connection to the backplane 302 to commencement of sending the reset signal 420a is therefore shorter than the amount of time from establishing a connection to the backplane 302 to commencement of sending the reset signal 420b. Even if both controller modules 202a-202b establish connections to the backplane 302 simultaneously, the different active times of the reset signals 420a-420b helps to ensure that only one controller module enters the primary role. When the system powers up, the processing devices 416a-416b boot up together, but the shorter reset active time of slot 0 preempts the master state. As another example, if the processing device 416a needs a hot reboot, the processing device 416a can output a reset signal 420a pulse to release the primary control role.

During system boot-up, the processing device 416a can retrieve a value from the slot identified input 428a to determine which slot (slot 0 or slot 1) the controller module 202a is plugged into. A low voltage could indicate that the controller module 202a is plugged into slot 0 because the slot identifier input 428a is grounded. A high voltage could indicate that the controller module 202a is plugged into slot 1 because the slot identifier input 428b is connected to the resistor 426b and the board-to board connector 410b.

The watchdog circuits 424a-424b perform a function similar to the heartbeat function. For example, the watchdog circuit 424a receives a tick-tock pulse signal 432a from an input/output terminal of the processing device 416b of the other controller module 202b and detects the working status (such as normal operation or fault) of the other controller module 202b. As a particular example, when the processing device 416b experiences a fault or abnormal operation, the processing device 416b ceases to output the tick-tock pulse signal 432a, and the watchdog circuit 424a outputs a timeout alarm. signal 430a to the processing device 416a. This informs the processing device 416a about the detected status of the other controller module 202b. The processing device 416a can write a takeover request to the register of the logic circuit 402a based upon receipt of the alarm signal 430a, thereby causing the faulted controller module to revert to the slave state.

Based on this functionality, the master/slave management devices 400a-400b can support various features, including any one or any combination of the following features:

Rapid Turn Over—the time for switching a controller module's role can be very fast, such as less than one millisecond;

Controller Module Hot-Swap—a controller module can be inserted into or removed from the RTU without powering down the RTU; and Default Master Module Position—a controller module in a specified slot or position in the RTU could by default become the master.

As an example of these features, the whole system can commence a power-up after both controller modules 202a-202b have already been installed into the RTU 102. Here, the default master module position feature of the master/slave management devices 400a-400b causes whichever controller module 202a-202b is plugged into a specified slot (such as slot 0) to be set as the master by default.

As another example of these features, when a master controller module is removed, the slave controller module takes over the primary control role immediately. If there is only one controller module plugged in and running as master and another controller module is subsequently plugged in, the newly plugged-in module can be set as a slave module. The hot-swap feature of the master/slave management devices 400a-400b can provide an open state corresponding to a removed controller module. The open state (an open circuit) is applied to the non-grounded terminal of the pull-down resistor 406a and provides a logic 0 to the input terminal 412a-412b of the NOT gate 408a-408b, thereby causing the remaining controller module to assume the master role.

As a third example of these features, assume the whole system is powered up, and only the controller module 202a is plugged-into slot 0 and operating as master. Subsequently, the other controller module 202b is added or otherwise connected to slot 1. In this scenario, the controller module hot-swap feature of the master/slave management devices 400a-400b prevents glitches when hot-plugging the subsequent controller module 202b. That is, any signals generated from establishing a connection between the backplane 302 and the subsequent controller module 202b do not affect the master/slave state of the controller module 202a.

As a fourth example of these features, assume both controller modules 202a-202b have been installed, and the whole system has completely powered up. Subsequently, one of the controller modules 202b experiences a problem or fault. In this scenario, the rapid turn over feature of the master/slave management devices 400a-400b causes the faulted controller module 202b to switch from master state to the slave state rapidly. As described below, the processing device 416b of the faulted controller module 202b can send a turn-over interrupt signal to the non-faulted controller module 202a that either (i) changes the non-faulted controller module 202a from slave to master or (ii) informs the non-faulted controller module 202a regarding the faulted working status of the controller module 202b. As described below, the non-faulted controller can generate a TAKEOVER signal.

Although FIGS. 2 through 4 illustrate details of an example RTU 102, various changes may be made to FIGS. 2 through 4. For example, the number(s) and type(s) of ports and interfaces shown in FIGS. 2 through 4 are for illustration only. Also, the functional divisions of the RTU 102 shown in FIGS. 2 through 4 are for illustration only. Various components in FIG. 2 through 4 could be omitted, combined, or further subdivided and additional components could be added according to particular needs.

Figure 5:
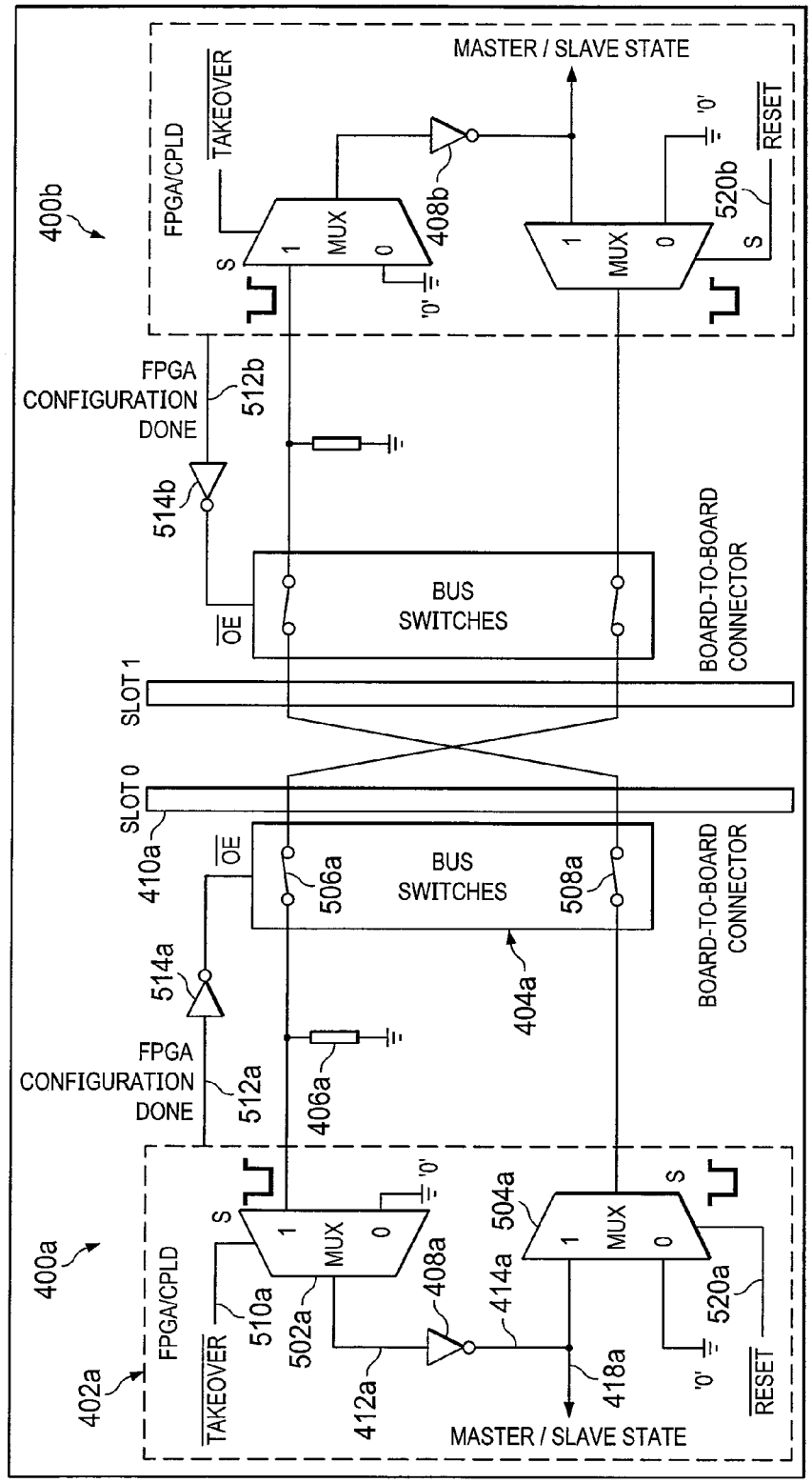
FIG. 5 illustrates additional details of master/slave management devices in the RTU of FIG. 4 according to this disclosure.

FIG. 5 illustrates additional details of the master/slave management devices 400a-400b in the RTU 102 of FIG. 4 according to this disclosure. The description of the components and features of the master/slave management device 400a below apply to the corresponding components and features of the master/slave management device 400b.

As shown in FIG. 5, the logic circuit 402a in the master/slave management device 400a includes the NOT gate 408a, a first multiplexer 502a coupled to the input terminal 412a of the NOT gate 408a, and a second multiplexer 504a coupled to the output terminal 414a of the NOT gate 408a. More particularly, the output terminal of the first multiplexer 502a is connected to the input terminal 412a of the NOT gate 408a, the logic 0 input of the first multiplexer 502a is grounded, and the logic 1 input of the first multiplexer 502a is connected to a first switch 506a of the set of bus switches 404a. A data selector terminal (S) of the first multiplexer 502a is controlled by a $\overline{\text{TAKEOVER}}$ signal 510a. The output terminal of the second multiplexer 504a is connected to a second switch 508a of the set of bus switches 404a, the logic 0 input of the second multiplexer 504a is grounded, and the logic 1 input of the second multiplexer 504a is connected to the output terminal 414a of the NOT gate 408a. A data selector terminal (S) of the second multiplexer 504a is controlled by a $\overline{\text{RESET}}$ signal 520a (which is an inverted version of the reset signal 420a).

The logic circuit 402a can generate the $\overline{\text{TAKEOVER}}$ signal 510a that controls the first multiplexer 502a. In other embodiments, the logic circuit 402a can internally generate a TAKEOVER signal, and the logic circuit 402a includes a NOT gate at the data selector terminal (S) of the first multiplexer 502a, reverses the inputs of the multiplexer 502a, or otherwise compensates for the way in which the $\overline{\text{TAKEOVER}}$ signal 510a is generated. When the $\overline{\text{TAKEOVER}}$ signal 510a is low, the first multiplexer 502a outputs a logic 0 that causes the master/slave state signal 418a to be high. When the $\overline{\text{TAKEOVER}}$ signal 510a is high, the first multiplexer 502a outputs the state of the other NOT gate 408b.

When the controller module 202a is in the secondary control role as a slave, the active low pulse can cause the controller module 202a to change from slave to master and cause the other controller module 202b to change from master to slave. It may not be recommended to use the I/O of the processing device 416a to control the $\overline{\text{TAKEOVER}}$ signal 510a directly since, if the processing device 416a hangs up, the I/O of the processing device 416a may pull down the $\overline{\text{TAKEOVER}}$ signal 510a and continuously hold the master state by mistake or error. To prevent this potential error, the logic circuit 402a includes a register (as described above) that the processing device 416a can access. When the controller module 202a needs to take over the primary control role, the processing device 416a can write a takeover request to the register of the logic circuit 402a. In response to reading the takeover request written by the processing device 416a, the logic circuit 402a can generate the $\overline{\text{TAKEOVER}}$ signal 510a.

In some embodiments, when no failure exists on either of the controller modules 202a-202b, a user selection can generate a master/slave state turn-over request. For example, upper system management software or a local button can force a turn-over or change of the master/slave arrangement, such as when system maintenance or firmware upgrade is needed.

The $\overline{\text{RESET}}$ signal 520a controls the output selection of the second multiplexer 504a. The logic circuit 402a could include a NOT gate between the input for receiving the reset signal 420a from the corresponding controller module 202a and the data selector terminal of the second multiplexer 504a. When the $\overline{\text{RESET}}$ signal 520a is low, the second multiplexer 504a outputs a logic 0 that releases the master state of the corresponding controller module 202a. When the $\overline{\text{RESET}}$ signal 520a is high, the second multiplexer 504a outputs the state of the corresponding NOT gate 408a (the master/slave state signal 418a).

The set of bus switches 404a selectively engages or cuts off the NOT gate circle. In some embodiments, a bus switch can be a field effect transistor (FET) switch, such as a low-assert switch shown in FIG. 6 or a high-assert switch shown in FIG. 7. As a particular example, each bus switch could represent an SN74CB3Q3306 active-low switch or an SN74CB3Q3305 active-high switch from TEXAS INSTRUMENTS. The bus switches 404a remain open until the logic circuit 402a is configured and outputs a "Config Done" signal 512a to the output-enable (OE) terminal of the set of bus switches 404a. The signal 512a controls whether the switches 506a-508a are opened or closed. While the components of the logic circuit 402a are in the process of logic circuit configuration or otherwise not ready to use, the signal 512a could be low to open the bus switches 506a, 508a. When the components of the logic circuit 402a are ready to use, the master/slave state signal 418a is also ready to use, and the signal 512a could be high to close the bus switches 506a, 508a.

The set of bus switches 404a helps to prevent signal glitches during hot-plugging, such as during the establishment of a connection between the controller module 202a and the backplane 302 while the RTU 102 is powered up.

For example, assume only a first controller module 202a is plugged in and operating as master, and a second controller module 202b is plugged in. The first controller module 202a is not affected by hot-plugging the second module 202b because the bus switches 404b remain open until the logic circuit 402b is configured and outputs the "config done" signal 512b. At that point, the second module 202b becomes the slave.

In embodiments where the logic circuit 402a is implemented using a CPLD, the master/slave management devices 400a-400b can include NOT gates 514a-514b between the OE terminals of the switches 404a-404b. Similarly, in embodiments where the bus switches 404a-404b are low-assert, the master/slave management devices 400a-440b include the NOT gates 514a-514b.

The pull-down resistor 406a is indirectly coupled to the input terminal 412a of the NOT gate 408a through the first multiplexer 502a. When only one controller module is plugged in, the pull-down resistor 406a sets a master state to that single plugged-in controller module by default. When two controller modules 202a-202b are plugged in but one of the logic circuits (such as the logic circuit 402a), the set of bus switches 404a on the not well-configured side breaks the NOT gate circle by opening its switches 506a-508a. The pull-down resistor 406b of the other side helps preempt a master state from establishing in the not well-configured side.

Figure 6:
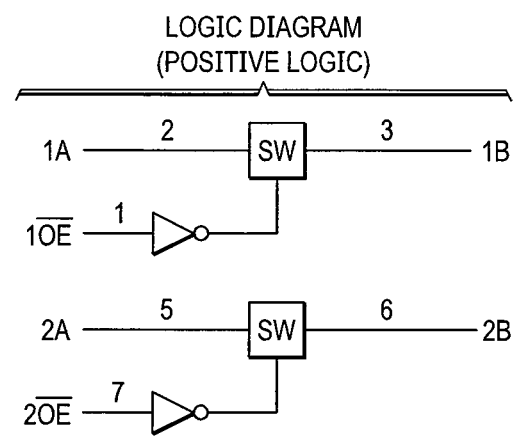
FIG. 6 illustrates an example low-assert switch according to this disclosure.
Figure 7:
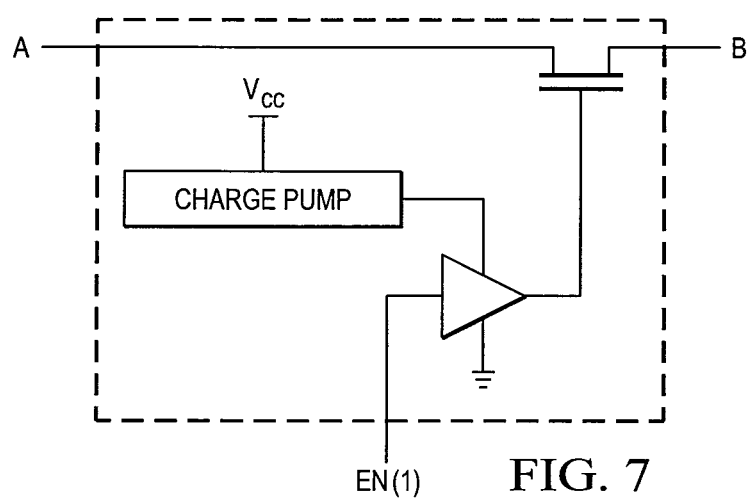
FIG. 7 illustrates an example high-assert switch according to this disclosure.

Although FIGS. 5 through 7 illustrate additional details of example master/slave management devices 400a-400b in the RTU 102, various changes may be made to FIGS. 5 through 7. For example, the functional division shown in FIG. 5 is for illustration only. Various components in FIG. 5 could be combined, further subdivided, or omitted and additional components could be added according to particular needs. Also, the switches shown in FIGS. 6 and 7 are examples only, and any other suitable switches could be used in the RTU 102.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A system comprising:
    first and second redundant controller modules, each controller module comprising mode management circuitry configured to identify whether the corresponding controller module operates in a master mode or a slave mode;
    wherein the mode management circuitry in each controller module is configured to couple to the mode management circuitry in the other controller module;
    wherein the mode management circuitries in the controller modules are configured to collectively operate so that one of the controller modules is assigned the master mode and the other of the controller modules is assigned the slave mode; and
    wherein at least one of the mode management circuitries in the controller modules is configured to assign the master mode to the corresponding controller module based on a takeover signal when the mode management circuitry in the corresponding controller module is ready for use.

2. The system of claim 1, wherein each controller module further comprises:
    at least one processing device configured to cause the mode management circuitry in the corresponding controller module to change the mode assigned to the corresponding controller module.

3. The system of claim 2, wherein the at least one processing device in each controller module is configured to communicate with the mode management circuitry in that controller module via a register.

4. The system of claim 1, wherein the mode management circuitries in the controller modules are configured to form a loop of multiple NOT gates.

5. The system of claim 1, wherein the mode management circuitry in each controller module comprises:
    a pull-down resistor configured to cause the mode management circuitry in that controller module to set that controller module to the master mode.

6. The system of claim 1, wherein:
    the controller modules have different reset active times for resetting the mode management circuitries in the controller modules; and
    the mode management circuitries are configured to assign the master mode to the controller module that has a shorter reset active time.

7. The system of claim 1, wherein the mode management circuitry in each controller module comprises:
    a NOT gate configured to output a state signal identifying whether the corresponding controller module operates in the master mode or the slave mode; and
    bus switches coupled to input and output terminals of the NOT gate and configured to remain open until the mode management circuitry is ready for use.

8. An apparatus comprising:
    a first controller module comprising first mode management circuitry configured to:
        identify whether the first controller module operates in a master mode or a slave mode;
        couple to second mode management circuitry in a second controller module;
        collectively operate with the second mode management circuitry so that one of the controller modules is assigned the master mode and the other of the controller modules is assigned the slave mode; and assign the master mode to the first controller module based on a takeover signal when the first mode management circuitry is ready for use.

9. The apparatus of claim 8, further comprising:
at least one processing device configured to cause the first mode management circuitry in the first controller module to change the mode assigned to the first controller module.

10. The apparatus of claim 9, wherein the at least one processing device is configured to communicate with the first mode management circuitry via a register.

11. The apparatus of claim 8, wherein the first mode management circuitry is configured to couple to the second mode management circuitry to form a loop of multiple NOT gates.

12. The apparatus of claim 8, wherein the first mode management circuitry comprises a pull-down resistor configured to cause the first mode management circuitry to set the first controller module to the master mode.

13. The apparatus of claim 8, wherein:
the first controller module has a reset active time for resetting the first mode management circuitry; and
when the first controller module has a shorter reset active time than the second controller module, the first mode management circuitry is configured to assign the master mode to the first controller module.

14. The apparatus of claim 8, wherein the first mode management circuitry comprises:
a NOT gate configured to output a state signal identifying whether the first controller module operates in the master mode or the slave mode; and
bus switches coupled to input and output terminals of the NOT gate and configured to remain open until the first mode management circuitry is ready for use.

15. A method comprising:
operating a first controller module that is configured to be coupled to a second controller module; and
identifying, by first mode management circuitry of the first controller module, whether the first controller module operates in a master mode or a slave mode;
wherein the first mode management circuitry collectively operates with second mode management circuitry of the second controller module so that one of the controller modules is assigned the master mode and the other of the controller modules is assigned the slave mode; and
wherein the first mode management circuitry assigns the master mode to the first controller module based on a takeover signal when the first mode management circuitry is ready for use.

16. The method of claim 15, further comprising:
causing, by at least one processing device, the first mode management circuitry in the first controller module to change the mode assigned to the first controller module.

17. The method of claim 16, wherein the at least one processing device is configured to communicate with the first mode management circuitry via a register.

18. The method of claim 15, further comprising:
coupling the first mode management circuitry to the second mode management circuitry to form a loop of multiple NOT gates.

19. The method of claim 15, further comprising:
using a pull-down resistor to cause the first mode management circuitry to set the first controller module to the master mode.

20. The method of claim 15, wherein:
the first controller module has a reset active time for resetting the first mode management circuitry; and
when the first controller module has a shorter reset active time than the second controller module, the first mode management circuitry assigns the master mode to the first controller module.

* * * * *